United States Patent
Stahl et al.

(10) Patent No.: US 11,984,625 B2
(45) Date of Patent: May 14, 2024

(54) METHOD FOR PRODUCING AN ELECTROCHEMICALLY ACTIVE UNIT AND SUPPORT ELEMENT FOR AN ASSEMBLY OF AN ELECTROCHEMICALLY ACTIVE UNIT

(71) Applicant: ElringKlinger AG, Dettingen (DE)

(72) Inventors: Peter Stahl, Metzingen (DE); Juergen Kraft, Metzingen (DE)

(73) Assignee: EKPO FUEL CELL TECHNOLOGIES GMBH, Dettingen (DE)

( * ) Notice: Subject to any disclaimer, the term of this patent is extended or adjusted under 35 U.S.C. 154(b) by 698 days.

(21) Appl. No.: 17/139,482

(22) Filed: Dec. 31, 2020

(65) Prior Publication Data

US 2021/0126266 A1   Apr. 29, 2021

Related U.S. Application Data

(63) Continuation of application No. PCT/EP2019/067367, filed on Jun. 28, 2019.

(30) Foreign Application Priority Data

Jul. 2, 2018  (DE) .................... 10 2018 115 997.8

(51) Int. Cl.
  *H01M 8/02*  (2016.01)
  *H01M 8/0273*  (2016.01)
  *H01M 8/0286*  (2016.01)

(52) U.S. Cl.
  CPC ....... *H01M 8/0286* (2013.01); *H01M 8/0273* (2013.01)

(58) Field of Classification Search
  CPC .......................... H01M 8/0286; H01M 8/0273
  USPC ......................................................... 429/480
  See application file for complete search history.

(56) References Cited

U.S. PATENT DOCUMENTS

| | | |
|---|---|---|
| 2006/0090317 A1 | 5/2006 | Wang et al. |
| 2007/0003821 A1 | 1/2007 | Belchuk |
| 2008/0142152 A1 | 6/2008 | Debe et al. |
| 2010/0167171 A1 | 7/2010 | Sasaoka |
| 2010/0239953 A1 | 9/2010 | Gerding |
| 2011/0151350 A1* | 6/2011 | Iverson ............... H01M 8/2418 429/479 |

(Continued)

FOREIGN PATENT DOCUMENTS

| | | |
|---|---|---|
| DE | 10 2010 049 549 | 4/2012 |
| DE | 10 2011 052 562 | 2/2013 |
| DE | 10 2016 205 043 | 9/2017 |

*Primary Examiner* — James M Erwin
(74) *Attorney, Agent, or Firm* — Womble Bond Dickinson (US) LLP (57) ABSTRACT

A method is provided for producing an electrochemically active unit that includes a membrane and at least one assembly, which includes a gas diffusion layer and a sealing element produced on the gas diffusion layer. The method is reliably performable with less expenditure on process apparatuses and process time and includes the following: producing the sealing element on the gas diffusion layer; connecting the sealing element and/or the gas diffusion layer to a support element; and assembling the membrane and the at least one assembly, which includes the gas diffusion layer and the sealing element, to form the electrochemically active unit.

21 Claims, 9 Drawing Sheets

(56) References Cited

U.S. PATENT DOCUMENTS

2017/0256810 A1* 9/2017 Lee .................... H01M 8/0286

* cited by examiner

METHOD FOR PRODUCING AN ELECTROCHEMICALLY ACTIVE UNIT AND SUPPORT ELEMENT FOR AN ASSEMBLY OF AN ELECTROCHEMICALLY ACTIVE UNIT

CROSS-REFERENCE TO RELATED APPLICATIONS

This application is a continuation of international application number PCT/EP2019/067367, filed on Jun. 28, 2019, which claims the benefit of German application number 10 2018 115 997.8, filed on Jul. 2, 2018, which are incorporated herein by reference in their entirety and for all purposes.

FIELD OF DISCLOSURE

The present invention relates to a method for producing an electrochemically active unit that comprises an membrane and at least one assembly, which comprises a gas diffusion layer and a sealing element produced on the gas diffusion layer.

BACKGROUND OF THE INVENTION

Such an assembly is referred to as a gas diffusion layer sealing element unit.

An electrochemically active unit, which comprises a membrane and at least one such assembly, may form, together with a respective bipolar plate, an electrochemical unit of an electrochemical device, which is configured e.g., as a fuel cell device or as an electrolyzer.

The electrochemical device preferably comprises a plurality of electrochemical unit arranged one on top of the other in a stacking direction, as well as preferably two end plates, between which the stack of electrochemical units is arranged and which are braceable against each other by means of a clamping device in order to apply the electrochemical units arranged therebetween and in particular the sealing elements thereof with a clamping force directed along the stacking direction.

In fuel cell devices and in electrolyzers, different media are guided in different planes of an electrochemical unit and, depending on design, in different regions of the same plane. Said media may, in particular, be an anodic fluid (fuel gas), a cathodic fluid (oxidizing agent) and optionally also a fluid cooling agent.

The media to be supplied to the electrochemical device (cathodic fluid, anodic fluid, cooling agent) are supplied to the different planes of the electrochemical device or discharged from the different planes of the electrochemical device by means of a media distribution structure (also called "manifold") with medium supply channels and medium discharge channels, which extend in the stacking direction of the electrochemical device, and must each be supplied from a medium supply channel to the flow field of the respective medium in an electrochemical unit and be discharged from the flow field back into a medium discharge channel. Both the medium supply channels and medium discharge channels as well as the flow fields must thereby be sealed in order to prevent leakage into the outside space of the electrochemical device and between the spaces through which the different media flow.

The media guided through the electrochemical device may neither mix with one another nor exit the electrochemical units, which is why seals are necessary in a plurality of planes.

Said seals may be realized, for example, on the basis of elastomer materials.

In electrochemical units with metallic bipolar plates, the seals can be achieved completely or partially by beads in the bipolar plate or by seals on the basis of elastomer materials.

The bipolar plates (also called separators or interconnectors) may be of one-part configuration or comprise at least two individual layers (bipolar plate layers).

The bipolar plate layers of a multi-layer bipolar plate may be connected together by joining methods like welding or adhesion.

A seal may be inserted as a separate component into the stack of electrochemical units or be fixed to a bipolar plate or to another constituent part of an electrochemical unit, for example to a gas diffusion layer.

If a sealing element is connected directly to a gas diffusion layer, a smooth transition between the seal and the gas diffusion layer is created.

A membrane pressed between two assemblies of in each case a gas diffusion layer and a sealing element is not subjected to excessive voltage peaks.

A cell structure with assemblies of in each case a gas diffusion layer and a sealing element can be constructed very compactly in comparison to a sealing solution with a rim reinforcing arrangement, because no additional space needs to be provided for the overlap between the rim reinforcing arrangement and the membrane electrode arrangement.

The connection of the sealing element to the gas diffusion layer may be effected e.g., in an injection molding process. A gas diffusion layer is thereby placed in a (preferably multi-part) injection molding tool and a sealing material or injection molding material is injection molded around said gas diffusion layer at its outer periphery.

This produces a penetration region at the transition between the gas diffusion layer and the sealing element, in which the injection molding material penetrates a portion of the porous gas diffusion layer.

Said penetration region creates a substance-to-substance and/or positive-locking connection between the gas diffusion layer and the sealing element, such that the gas diffusion layer and the sealing element are mechanically connected to each other sufficiently well during the subsequent assembly steps and during the operation of the electrochemical device.

In the penetration region, the pores of the gas diffusion layer are filled with the injection molding material, which forms the sealing material after curing, such that in this region, the transport of a cathodic fluid or an anodic fluid to the electrochemically active region of the electrochemical unit is impeded. The penetration region should therefore comprise a smallest possible portion of the gas diffusion layer, but should still be large enough to ensure a stable mechanical connection between the gas diffusion layer and the sealing element.

In order to delimit the penetration region on the gas diffusion layer side, the gas diffusion layer, which is mechanically compressible in its thickness direction (in parallel to the stacking direction of the electrochemical device), is locally pressed in an injection molding tool by means of a pressing edge. As a result, the capillary pressure in the pores of the gas diffusion layer rises locally, and the penetration of the gas diffusion layer with the injection molding material is delimited in the x and y directions perpendicular to the thickness direction (z direction).

The pressing edge must press the gas diffusion layer with a minimum pressure to delimit the penetration of the gas diffusion layer with the injection molding material. However, the local pressing of the gas diffusion layer by the pressing edge also may not be too high, as the gas diffusion layer may be damaged upon excessive pressing, for example due to fiber breakage.

The level of penetration of the gas diffusion layer with the injection molding material is dependent on the local pressure, in the respective region of the gas diffusion layer, of the injection molding composition in the injection molding tool. In addition, the degree of penetration of the gas diffusion layer with the injection molding material depends on the viscosity of the injection molding material, on the temperature of the injection molding material (which influences, among other things, the viscosity of the injection molding material) and on the properties of the gas diffusion layer in the region of the pressing edge and in the remaining region of the gas diffusion layer, in particular on the porosity, on the tortuosity (i.e., on the degree of the twistedness of the transport paths within the gas diffusion layer), on the capillary pressure and on the hydrophobization.

Upon the connection of a sealing element to a gas diffusion layer in an injection molding process or a similar method, injection molding material is introduced at an injection point or at a plurality of injection points into the cavity of the injection molding tool and then spreads along flow paths while forming a flow front in the cavity.

The production of the sealing element on the respective gas diffusion layer preferably takes place in an injection molding tool at a temperature, which is typically higher than 100° C. and lower than 200° C.

After the injection molding operation and a heating time for cross-linking the injected sealing material, in particular an elastomer material, the injection molding tool is opened and the assembly of the gas diffusion layer and the sealing element injection molded on the outer rim of the gas diffusion layer is removed from the injection molding tool.

In known methods for producing electrochemically active units, which comprise a membrane and at least one assembly in the form of a gas diffusion layer sealing element unit, the gas diffusion layer sealing element units are produced and further processed in individual part processes.

The following disadvantages arise in that case:
In the manufacture of a gas diffusion layer sealing element unit in an injection molding tool, a strong adhesion may arise between the sealing material of the sealing element on the one hand and the delimiting walls of the injection molding tool cavity on the other hand. The demolding of the sealing element without damaging the same then requires increased expenditure (for example a coating of the injection molding tool for reducing the adhesion, gripper systems, or ejector systems), because the gas diffusion layer and the sealing element can be very easily damaged.

The handing of the gas diffusion layer sealing element unit requires increased effort due to the mechanical instability of this assembly. In particular the outside regions of the sealing element are very unstable, which is why the deposit of the assembly in a process apparatus in a manner reproducible in form and position cannot be ensured.

The gas diffusion layer sealing element unit cannot be deposited in a manner reproducible in form and position in support systems that serve for processing in an individual part process. In each process in which the position of the assembly has to be determined exactly, a complex measurement or mapping of the assembly is thus also necessary.

The measurement of the gas diffusion layer sealing element unit is made more difficult by the non-reproducible deposit position of this assembly.

The assembling of the electrochemically active unit (also called membrane electrode arrangement (MEA)), which comprises a (for example catalyst-coated) membrane and preferably two gas diffusion layer sealing element units, is a laborious individual part process, because each individual gas diffusion layer sealing element unit must be received, measured, and positioned (for example using linear robots or the like). Further, each gas diffusion layer sealing element unit must be brought into the shape and location required for the assembling of the electrochemically active unit. The process time required for an assembling with such systems is very long.

Sealing materials may have a very strong tendency to adhere to one another and to other materials, for example a process device. The separation of the gas diffusion layer sealing element units and receiving the same from process apparatuses may be made more difficult by the adhesion.

SUMMARY OF THE INVENTION

In accordance with an embodiment of the invention, a method for producing an electrochemically active unit of the kind stated at the outset is provided, which is reliably performable with little expenditure on process devices and process time.

In accordance with an embodiment of the invention, a method for producing such an electrochemically active unit is provided, which comprises the following:
producing the sealing element on the gas diffusion layer;
connecting the sealing element and/or the gas diffusion layer to a support element;
assembling the membrane and the at least one assembly, which comprises the gas diffusion layer and the sealing element, to form the electrochemically active unit.

Underlying the solution in accordance with the invention is the concept of connecting the assembly (gas diffusion layer sealing element unit) at its outer periphery, at least in regions, to a support element, which makes it possible to subsequently process the assembly in rolling processes or e.g., as a Leporello.

In particular, the demolding of the assembly from an injection molding tool, by means of which the sealing element is produced on the gas diffusion layer, can thereby be significantly simplified, because a demolding force can be exerted on the sealing element by way of the support element.

In further process steps, in particular upon assembling the electrochemically active unit (which comprises at least one gas diffusion layer sealing element unit and a membrane), the processing of the gas diffusion layer sealing element units can take place directly from the support element, which may be wound up to a roll, for example.

If positioning elements are provided on the support element, a very high positioning accuracy of the gas diffusion layer sealing element units can be ensured in the assembling operation, without elaborate position recognition systems being required for this purpose.

The processing speed in a process in which the gas diffusion layer sealing element units are arranged on the support element can be selected to be very high in comparison to individual part processes, in particular when the gas diffusion layer sealing element units are processed from a support element roll.

The gas diffusion layer sealing element unit can be positioned and/or held in a processing operation, for example in a coating operation, by means of the support element.

In such a coating operation, for example a catalyst layer and/or an ionomer layer may be applied completely or partially to the gas diffusion layer sealing element unit.

The assembly of one or more gas diffusion layer sealing element units and a support element may be wound up on a roll. As a result, both the storage of the gas diffusion layer sealing element units and the positioning and/or the positionally accurate accommodation of the gas diffusion layer sealing element in further process steps is made easier.

When storing the assembly of one or more gas diffusion layer sealing element units and the support element in the form of a roll, one or more intermediate layers may be provided, which are placed between layers of the support element. Thus, in particular, an adhesion of the gas diffusion layer sealing element units or the support element and/or damage to the gas diffusion layer sealing element units or the support element can be avoided.

In the method in accordance with the invention for producing an electrochemically active unit, provision may be made for the gas diffusion layer of the assembly, which comprises a gas diffusion layer and a sealing element produced on the gas diffusion layer, to already be connected to the support element before the production of the sealing element.

Alternatively or in addition hereto, provision may be made for the sealing element to be connected to the support element upon the production of said sealing element.

The sealing element may, in particular, be produced by means of an injection molding operation, by means of a screen printing operation, or by means of a dispenser application operation.

In a particular embodiment of the invention, provision is made for the sealing element to be in contact with the support element along the entire periphery of said sealing element.

Alternatively hereto, provision may be made for the sealing element to be in contact with the support element at a plurality of contact regions spaced at a distance from one another along a peripheral direction of the sealing element.

The support element may comprise and foil and/or a band.

In particular, provision may be made for the support element to be configured as a foil and/or as a band.

The material thickness of the support element is preferably less than 1 mm, in particular less than 0.4 mm, particularly preferably less than 0.1 mm.

In principle, provision may be made for one only one sealing element and/or only one gas diffusion layer to be connected to the support element.

However, provision is preferably made for a plurality of sealing elements and/or a plurality of gas diffusion layers to be connected to the same support element.

The support element with the at least one sealing element arranged thereon and/or the at least one gas diffusion layer arranged thereon may be wound up, in particular for the purposes of storage, transport, or for use in a process, which is configured as a rolling process.

When winding up the support element, at least one intermediate element may be introduced between successive wound layers of the support element in order to avoid an adhesion of the successive wound layers of the support element to each other and/or to avoid damage to the wound layers of the support element.

In a particular embodiment of the method, provision is made for at least one sealing element arranged on the support element and/or at least one gas diffusion layer arranged on the support element to be coated with a coating material.

Such a coating material may, in particular, be a catalyst material or a membrane material, for example an ionomer material.

The assembling of the membrane and the at least one assembly, which comprises a gas diffusion layer and a sealing element, preferably takes place in a rolling process, in which the at least one assembly arranged on the support element and the membrane arranged on a membrane support element are joined together.

In order to be able to position or move the support element with the assembly arranged thereon of gas diffusion layer and sealing element, or the support element before the arrangement of the gas diffusion layer and/or the sealing element on the support element, or in order to be able to connect the support element to the gas diffusion layer and/or to the sealing element, provision may be made for the support element to be provided with at least one positioning element and/or with at least one holding element.

In a particular embodiment of the invention, provision is made for a support element core region connected to the sealing element and/or to the gas diffusion layer to be separated out of the support element.

The separation of the support element core region out of the support element may take place e.g., by means of punching, cutting, roll-cutting, laser cutting, or water jet cutting.

In particular, provision may be made for the support element to have a predetermined breaking point and/or a perforation, along which the support element core region connected to the sealing element and/or to the gas diffusion layer is separated out of the support element.

Alternatively or in addition hereto, a separation of a sealing element core region from the support element may also be effected by the sealing element having a predetermined breaking point, along which the sealing element core region is separated from a sealing element outside region. The sealing element outside region is thereby preferably connected to the support element.

The present invention thereby further relates to a support element for an assembly, which comprises a gas diffusion layer and a sealing element produced on the gas diffusion layer.

Underlying the present invention is the further object to create a possibility of reliably positioning such an assembly with little expenditure on process apparatuses and process time.

This object is achieved in accordance with the invention by the sealing element and/or the gas diffusion layer being connected to the support element.

Particular embodiments of the support element in accordance with the invention have already been described above in conjunction with particular embodiments of the method in accordance with the invention for producing an electrochemically active unit that comprises a membrane and at least one assembly, which comprises a gas diffusion layer and a sealing element produced on the gas diffusion layer.

The support element in accordance with the invention is suited in particular for use in the method in accordance with the invention for producing an electrochemically active unit.

The electrochemically active unit preferably forms a constituent part of an electrochemical device, which is configured e.g., as a fuel cell device or as a electrolyzer.

If the electrochemical device is configured as a fuel cell device, it is then preferably a polymer electrolyte membrane fuel cell device.

In accordance with the invention, at least one of the two gas diffusion layer sealing element units of an electrochemically active unit is connected to the support element, preferably during the manufacturing process of the sealing element.

The support element may be a foil with recesses in which in each case a gas diffusion layer sealing element unit is fixed.

A plurality of gas diffusion layer sealing element units may be fixed to a band-shaped support element one behind the other, such that a support element with successive gas diffusion layer sealing element units is created.

Each gas diffusion layer sealing element unit may be connected completely or only partially to the support element over the periphery of said gas diffusion layer sealing element unit.

The support element may be in contact only with the sealing element of the gas diffusion layer sealing element unit.

Alternatively hereto, the support element may in contact with both the sealing element and the gas diffusion layer of the gas diffusion layer sealing element unit.

Positioning elements may be provided on the support element, which serve to position the support element during the manufacturing process of the gas diffusion layer sealing element unit.

Said positioning elements may also be used in subsequent process steps in order to position and/or move the support element and thus the gas diffusion layer sealing element unit.

The support element may be wound up on a roll.

One or more intermediate elements may thereby be introduced between the wound layers of the support element (with the gas diffusion layer sealing element units arranged thereon).

The gas diffusion layer may already be arranged on the support element before the manufacture of the sealing element. This may take place in a rolling process, for example. As a result, the gas diffusion layer may, for example, be positioned for the manufacturing process of the sealing element by means of positioning elements arranged on the support element.

Before the production of the sealing element running around the periphery of the gas diffusion layer or locally or in parts, said gas diffusion layer may be connected to the support element at a plurality of contact regions succeeding one another along the peripheral direction of the gas diffusion layer and spaced at a distance from one another in the peripheral direction of the gas diffusion layer.

The connection between the sealing element and/or the gas diffusion layer on the one hand and the support element on the other hand may be designed such that a simple release of the connection is possible in a subsequent process step, for example in a process step for assembling the electrochemically active unit and/or for mounting the gas diffusion layer sealing element unit.

The support element may be provided with a perforation.

The support element may be provided with a folded edge at least in parts in a rim region of the support element facing toward the sealing element.

The folded edge may be configured such that it is easily releasable from the sealing element through the application of a force.

The support element may be removed completely from the gas diffusion layer sealing element unit or remain partially on the gas diffusion layer sealing element unit before or during the assembling of the electrochemically active unit (membrane electrode arrangement) and/or before or during the mounting of a stack of electrochemically active units.

Provision may also be made for the support element to be respectively partially detached from the gas diffusion layer sealing element unit in a plurality of separation steps.

The support element may be provided with one or more positioning elements, which, for example in the assembling of the electrochemically active unit and/or in the mounting of a stack of electrochemically active units, may be used to position the gas diffusion layer sealing element unit.

Such a positioning element may be produced on the support element, for example, by means of a separating operation, in particular by means of punching, cutting or the like.

Alternatively or in addition hereto, an additional element that enables a positioning may be attached to the support element.

The at least one positioning element may be configured such that it reduces the positioning tolerance.

In particular, the at least one positioning element may have a high rigidity.

The gas diffusion layer sealing element unit arranged on the support element may be coated in a coating operation with a coating material, for example with a catalyst material, a membrane material, or an ionomer material.

In such a coating operation, at least one positioning element that is arranged on the support element may be used for positioning the gas diffusion layer sealing element unit relative to a coating apparatus and thus for achieving a positionally correct coating.

A roller-supported process may preferably be used for the coating of the gas diffusion layer sealing element unit.

For the assembling of a plurality of, for example two, gas diffusion layer sealing element units and a (for example catalyst-coated) membrane (CCM) to form an electrochemically active unit, in particular a membrane electrode arrangement (MEA), the gas diffusion layer sealing element units, which are each connected to a support element, and a membrane arranged on a membrane support element may be connected to one other in one or more rolling processes.

A roller-supported processing enables a very exact positioning of the individual components of the electrochemically active unit relative to one another and/or a very high process speed.

Further, provision may be made for the sealing element to first be connected to the support element and for the gas diffusion layer of the gas diffusion layer sealing element unit to then, in a further step, be arranged on the support element and/or on the sealing element, for example be placed in the sealing element support element unit.

The connection between the gas diffusion layer and the sealing element may hereby be produced e.g., by means of positive engagement.

Further features and advantages of the invention are subject matter of the subsequent description and the graphical representation of exemplary embodiments.

BRIEF DESCRIPTION OF THE DRAWINGS

The same or functionally equivalent elements are provided with the same reference numerals in all Figures.

DETAILED DESCRIPTION OF THE INVENTION

Figure 1:
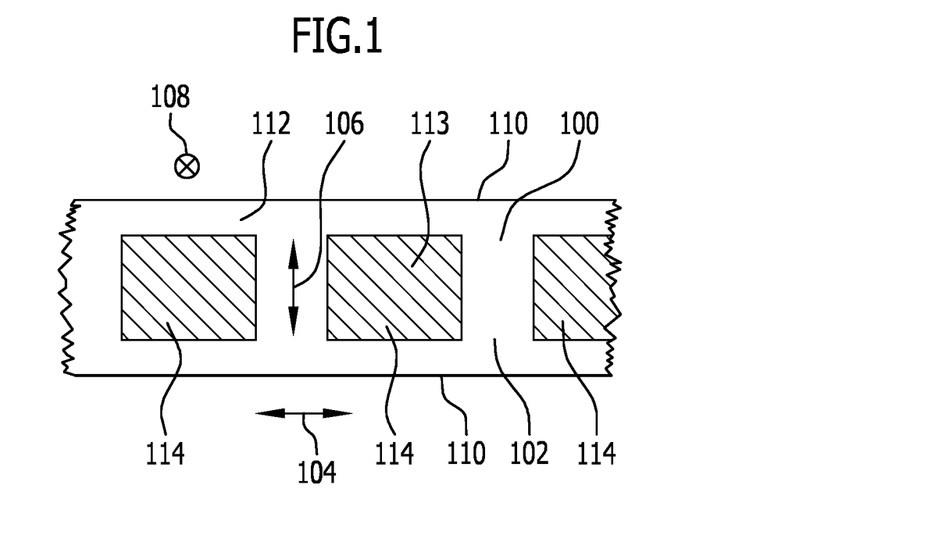
FIG. 1 shows a sectional plan view of a band-shaped support element on which a plurality of gas diffusion layer sealing element units are arranged.

A support element 100 depicted in FIG. 1 has the form of a band 102, which extends in a longitudinal direction 104 and is delimited in a transverse direction 106 oriented perpendicular to the longitudinal direction 104 and perpendicular to a thickness direction 108 of the support element by two rims 110 running substantially in parallel to the longitudinal direction 104 of the support element 100.

The support element 100 comprises e.g., a foil with a small thickness of e.g., less than 1 mm, preferably less than 0.5 mm.

The support element may comprise e.g., a polytetrafluoroethylene, a polyvinylidene fluoride, a polyester, a polyamide, a copolyamide, a polyamide elastomer, a polyimide, a polyurethane, a polyurethane elastomer, a silicone, a silicone rubber, and/or a silicone-based elastomer, and in particular may be made substantially entirely of one or more of these materials.

Arranged on the support element 100 are preferably a plurality of assemblies 113 configured as gas diffusion layer (GDL) sealing element units 114, which are spaced at a distance from one another in the longitudinal direction 104 of the support element 100.

The gas diffusion layer sealing element units 114 are preferably also spaced at a distance from at least one of the rims 110 of the support element 100, preferably from both rims 110 of the support element 100, in the transverse direction 106 of the support element 100.

Figure 2:
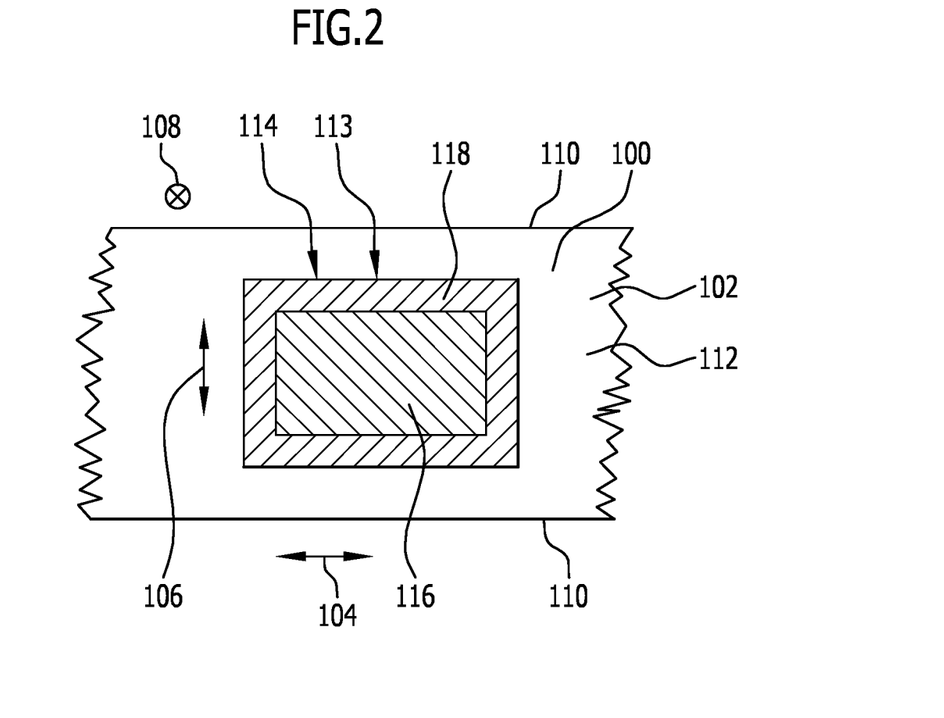
FIG. 2 shows an enlarged depiction of one of the gas diffusion layer sealing element units from FIG. 1, which shows that the sealing element of the gas diffusion layer sealing element unit is in contact with the support element along the entire periphery of said gas diffusion layer sealing element unit.

As can be seen in the enlarged depiction from FIG. 2, each gas diffusion layer sealing element unit 114 comprises a gas diffusion layer 116, which is provided with a sealing element 118 at its periphery.

The gas diffusion layer 116 may be an anode-side or a cathode-side gas diffusion layer.

The gas diffusion layer 116 has a porosity, such that a fluid medium, for example a fuel gas or an oxidizing agent, can pass through the gas diffusion layer 116 in the thickness direction 108.

The sealing element 118 preferably comprises an elastomer material and is formed in particular completely of an elastomer material.

The sealing element 118 may be produced on the gas diffusion layer 116 e.g., by means of an injection molding operation, a screen printing operation, or a dispenser application operation.

Figure 3:
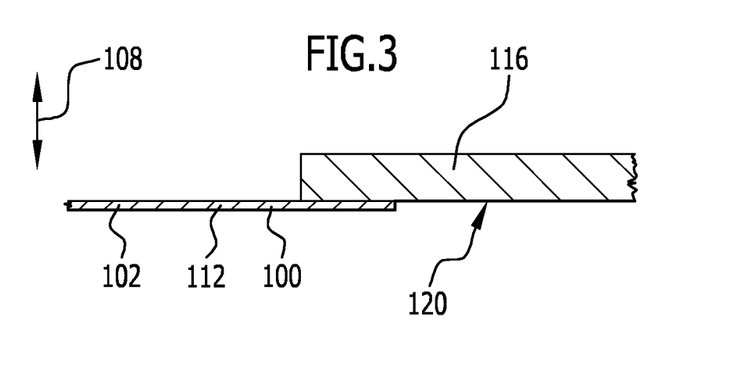
FIG. 3 shows a sectional cut through a gas diffusion layer, which is connected to a support element.

As can be seen e.g., in FIG. 3, the gas diffusion layer 116 may already be connected to the support element 100 before the production of the sealing element 118.

The support element 100 is preferably provided with at least one recess 120, which is covered by a gas diffusion layer sealing element unit 114 when same is arranged on the support element 100.

Each gas diffusion layer sealing element unit 114 is preferably associated with such a recess 120 in the support element 100.

The recess 120 preferably extends in the thickness direction 108 through the support element 100.

Figure 4:
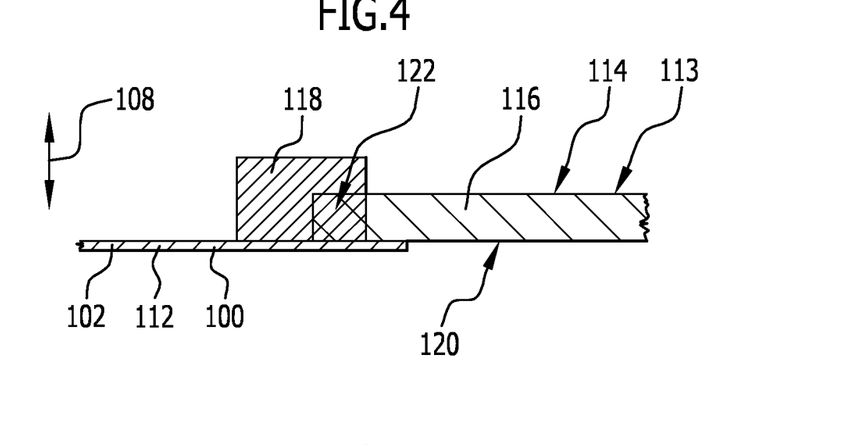
FIG. 4 shows a sectional cut through a gas diffusion layer sealing element unit, the gas diffusion layer and sealing element of which are connected to a support element.

As depicted in FIG. 4, the sealing element 118 may be produced on the gas diffusion layer 116 such that it is connected both to the gas diffusion layer 116 and to the support element 100.

The sealing element 118 may be produced on the gas diffusion layer 116 in such a way that the sealing material of the sealing element 118 penetrates into the porous material of the gas diffusion layer 116 in a penetration region 122, such that the sealing element 118 is connected to the gas diffusion layer 116 in a substance-to-substance and/or positive-fitting and mechanically stable manner.

Figure 5:
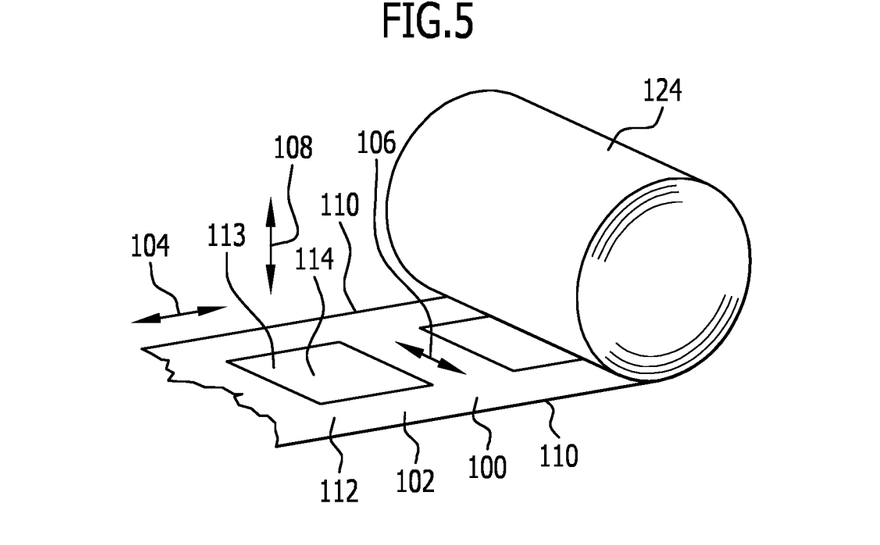
FIG. 5 shows a schematic perspective depiction of a support element gas diffusion layer sealing element unit roll to which the band-shaped support element from FIG. 1, which bears a plurality of gas diffusion layer sealing element units, can be wound up.

As depicted in FIG. 5, the band-shaped support element 100, which bears at least one gas diffusion layer sealing element unit 114, preferably a plurality of gas diffusion sealing element units 114, may be wound up to a roll 124 for storage and transport or for other process steps, for example for a heat treatment operation.

Figure 12:
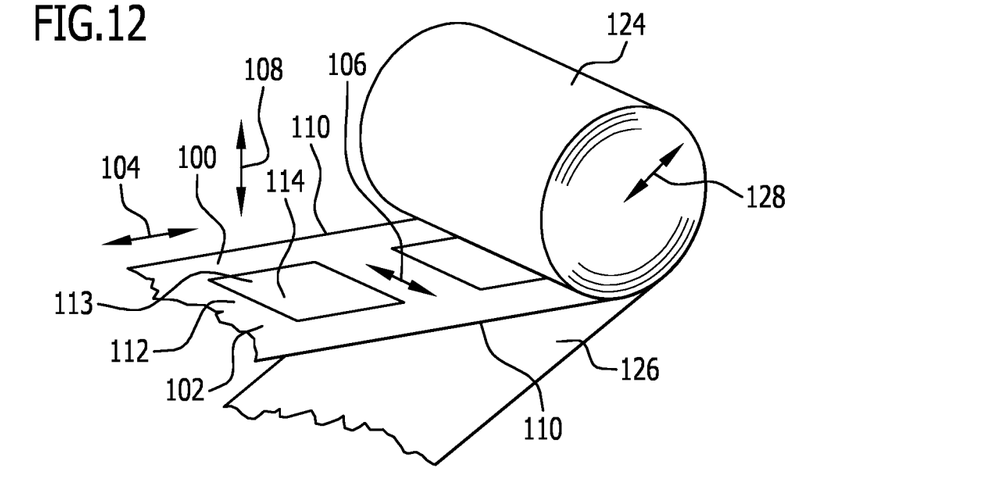
FIG. 12 shows a perspective depiction of a support element gas diffusion layer sealing element unit roll, which is producible by winding up a band-shaped support element on which a plurality of gas diffusion layer sealing element units are arranged, wherein a band-shaped intermediate element is wound up together with the band-shaped support element, such that layers of the support element and of the gas diffusion layer sealing element units that follow one another in the winding in the radial direction are separated from one another in each case by a layer of the intermediate element.

As can be seen in FIG. 12, when winding up the support element 100, a band-shaped intermediate element 126 may be wound up together with the support element 100, such that layers of the support element 100 and of the gas diffusion layer sealing element units 114 arranged thereon following one another in a radial direction 128 of the roll 124 are each separated from one another by a respective layer of the intermediate element 126 arranged therebetween.

This serves to protect the support element 100 and/or the gas diffusion layer sealing element units 114 from damage and/or to reduce adhesion between the layers of the support element 100 and the gas diffusion layer sealing element units 114 arranged thereon following one another in the radial direction 128 of the roll 124.

Figure 6:
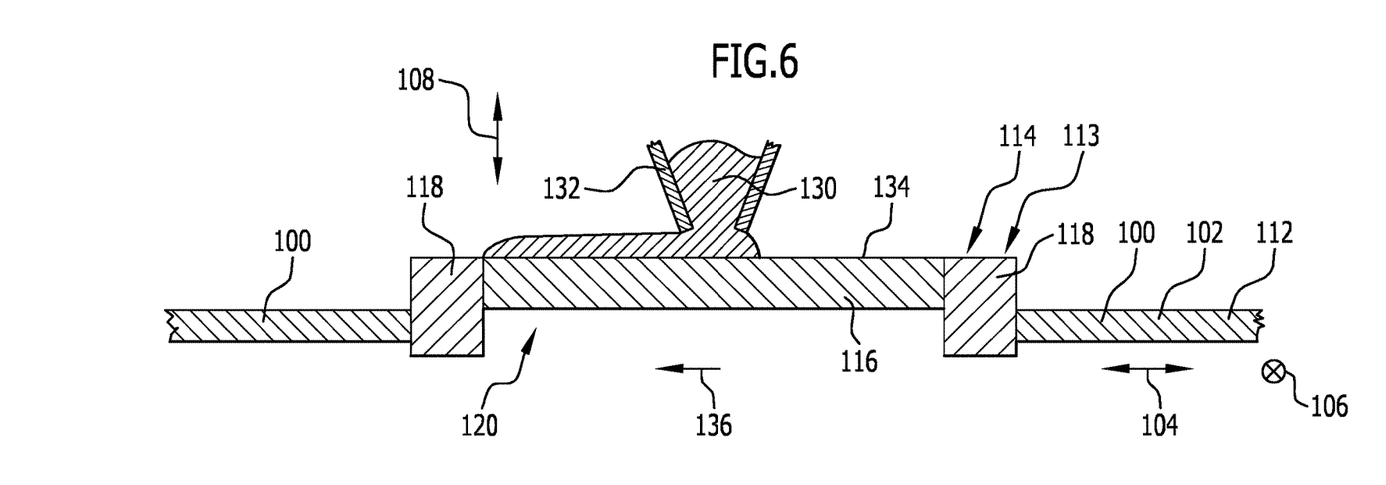
FIG. 6 shows a sectional cut through a support element with a gas diffusion layer sealing element unit arranged thereon, wherein the gas diffusion layer sealing element unit is coated with a coating material, for example with a catalyst material and/or with an ionomer/membrane material.

As depicted in FIG. 6, a gas diffusion layer sealing element unit 114 arranged on the support element 100 may be subject to a treatment operation, in particular a coating operation, in particular before or after winding up the support element 100 to a roll 124.

For example, provision may be made for the gas diffusion layer 116 and/or the sealing element 118 to be provided with a coating of a coating material 130, for example a catalyst material and/or an ionomer/membrane material.

The coating material 130 may be applied e.g., from a coating material outlet 132 onto a surface 134 of the gas diffusion layer sealing element unit 114, in particular of the gas diffusion layer 116.

The gas diffusion layer sealing element unit 114 may thereby be stopped during the coating operation, or the support element 100 with the gas diffusion layer sealing element unit 114 arranged thereon may be moved during the coating operation relative to the coating material outlet 132 along a movement direction 136, which may be oriented substantially in parallel to the longitudinal direction 104 of the support element 100.

As will be described in more detail below, provision may be made for the support element 100 to be provided with one or more positioning elements 166 for increasing the positional accuracy during the coating operation.

Figure 7:
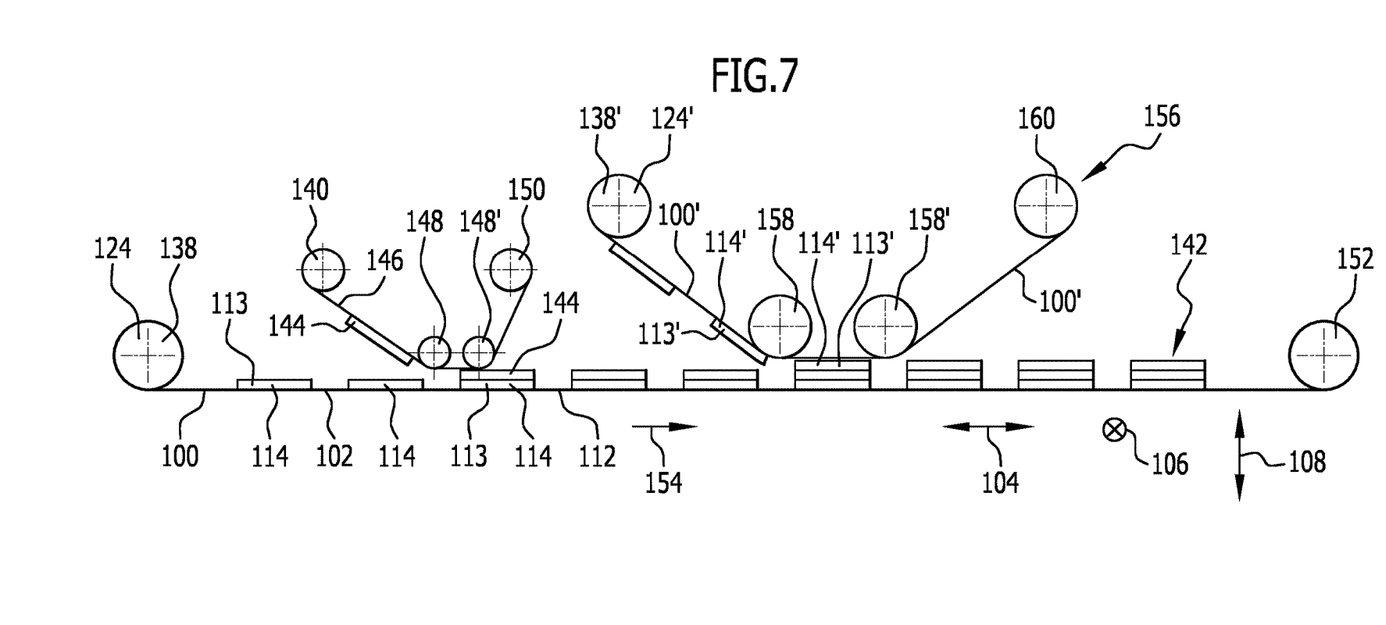
FIG. 7 shows a schematic depiction of an assembling operation in which, in a rolling process, first gas diffusion layer sealing element units that are arranged on a first band-shaped support element are connected to (for example catalyst-coated) membranes that are arranged on a membrane support element, and then the membranes are connected to second gas diffusion layer sealing element units that are arranged on a second band-shaped support element in order to thus assemble electrochemically active units, which each comprise two gas diffusion layer sealing element units and a membrane arranged therebetween.

A support element gas diffusion layer sealing element unit material 138 wound up to a roll can be assembled to form an electrochemically active unit 142 in a rolling process with a membrane support element membrane material 140 wound up to a roll and a further support element gas diffusion layer sealing element unit material 138' wound up to a roll, as is depicted in FIG. 7.

Thereby, in a first process step, a respective first gas diffusion layer sealing element unit 114 that is arranged on a band-shaped support element 100, after being unwound from the roll 124, is connected to a (for example catalyst-coated) membrane 144, which is arranged on the unwound membrane support element 146. The membrane 144 is thereby detached from the membrane support element 146.

The membrane support element 146 runs via two guide rollers 148, 148' to a winding roller 150 (driven to a rotational movement).

The first support element 100 runs from the unwound roll 124 to a winding roller 152 (driven to a rotational movement).

The unit, produced in the first process step, of the first gas diffusion layer sealing element unit 114 and the membrane 144 is thereby conveyed together with the first support element 100 along a conveying direction 154 of the assembling apparatus denoted as a whole with 156.

In a further process step, a second gas diffusion layer sealing element unit 114' from the second support element 100', which is unwound from the second roll 124', is assembled, in particular laminated, onto the side of the membrane 144 opposite the first gas diffusion layer sealing element unit 114. The second gas diffusion layer sealing element unit 114' is thereby detached from the second support element 100'.

The second support element 100' runs via two guide rollers 158, 158' to a winding roller 160 (driven to a rotational movement).

The electrochemically active unit (membrane electrode arrangement; MEA) formed of the first gas diffusion layer sealing element unit 114, the membrane 144, and the second gas diffusion layer sealing element unit 114' is wound up on the winder roller 152 together with the first support element 100'.

The wound up support element MEA material can then later be unwound in order to be mounted together with the bipolar plates (not depicted) upon the mounting of the electrochemical device, which contains the electrochemically active units 142.

In the rolled up state, the support element MEA roll can be stored and/or transported.

Figure 8:
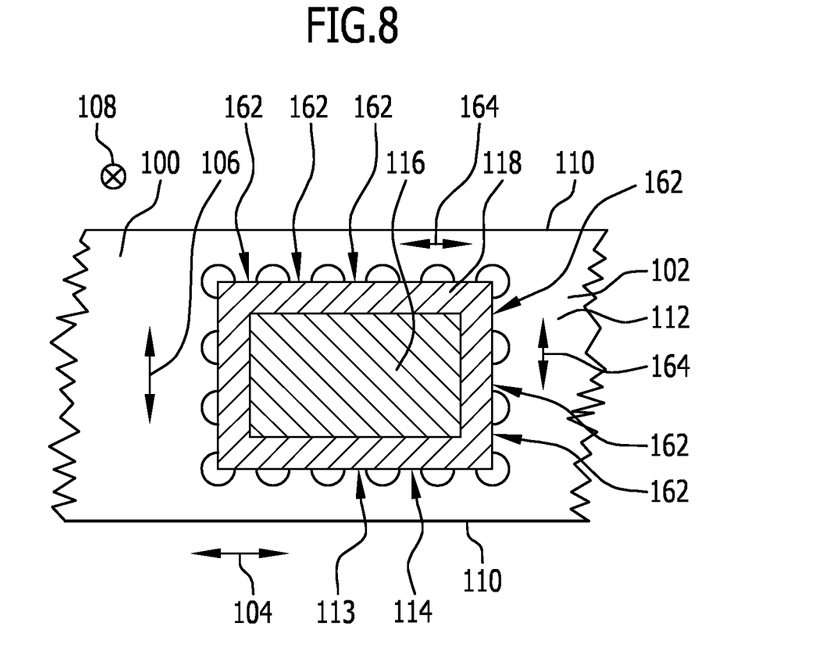
FIG. 8 shows a sectional plan view of a support element on which a gas diffusion layer sealing element unit is arranged, wherein the sealing element is in contact with the support element at a plurality of contact regions spaced at a distance from one another along a peripheral direction of the sealing element.

In an alternative embodiment, depicted in FIG. 8, of a support element 100 with at least one gas diffusion layer sealing element unit 114 arranged thereon, the gas diffusion layer sealing element unit 114 is connected to the support element 100 not across its entire periphery, but rather only in a plurality of contact regions 162, which follow one another along a peripheral direction 164 of the gas diffusion layer sealing element unit 114 and are spaced at a distance from one another along the peripheral direction 164 of the gas diffusion layer sealing element unit 114.

The sealing element 118 and/or the gas diffusion layer 116 may thereby be connected to the support element 100 in the contact regions 162.

In this embodiment, the support element 100 is thus connected to the gas diffusion layer sealing element unit 114 only partially along the periphery of the gas diffusion layer sealing element unit 114.

Figure 9:
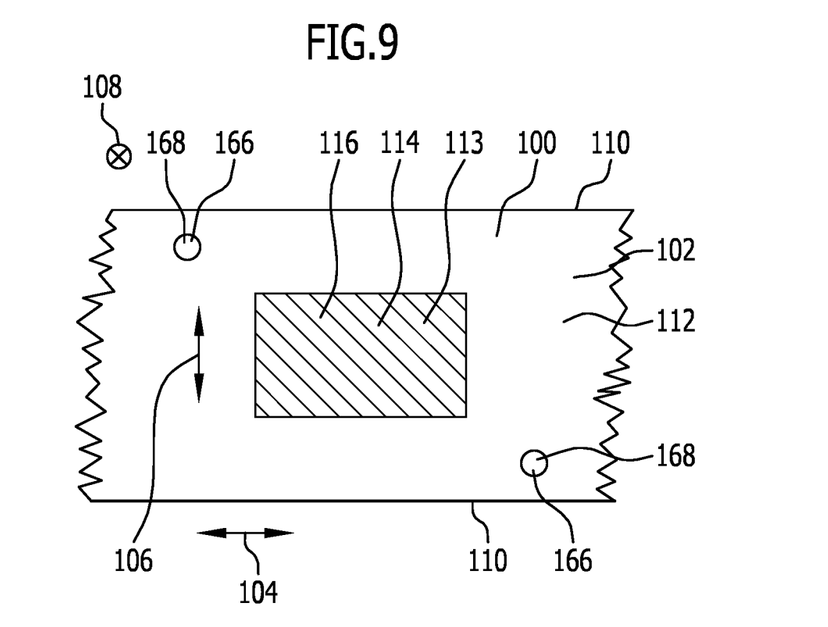
FIG. 9 shows a sectional plan view of a support element on which at least one positioning element is arranged, which may serve for the positioning of the support element, the gas diffusion layer sealing element unit, and/or the gas diffusion layer during the manufacturing process of the sealing element and/or in processes subsequent to the manufacture of the sealing element, for example in a coating operation or in the assembling of the electrochemically active unit using the gas diffusion layer sealing element unit.

In an alternative embodiment, depicted in FIG. 9, of a support element 100 on which at least one gas diffusion layer sealing element unit 114 is arranged, the support element 100 has one or more positioning elements 166, which may serve to position the support element 100 with the gas diffusion layer 116 arranged thereon before the production operation of the sealing element 118 and/or to position the gas diffusion layer sealing element unit 114 after the production of the sealing element 118 on the gas diffusion layer 116 in a processing operation or in an assembling operation.

Provision may thereby be made for each gas diffusion layer sealing element unit 114 to each be associated with at least one respective positioning element 166, preferably at least two positioning elements 166.

Each positioning element 166 may be configured e.g., as an aperture 168 in the support element 100.

Alternatively or in addition to the positioning elements 166, movement elements (not depicted) may also be provided on the support element 100, which movement elements may serve to move the support element 100 (together with a gas diffusion layer sealing element unit 114 arranged thereon or without a gas diffusion layer sealing element unit 114).

Figure 10:
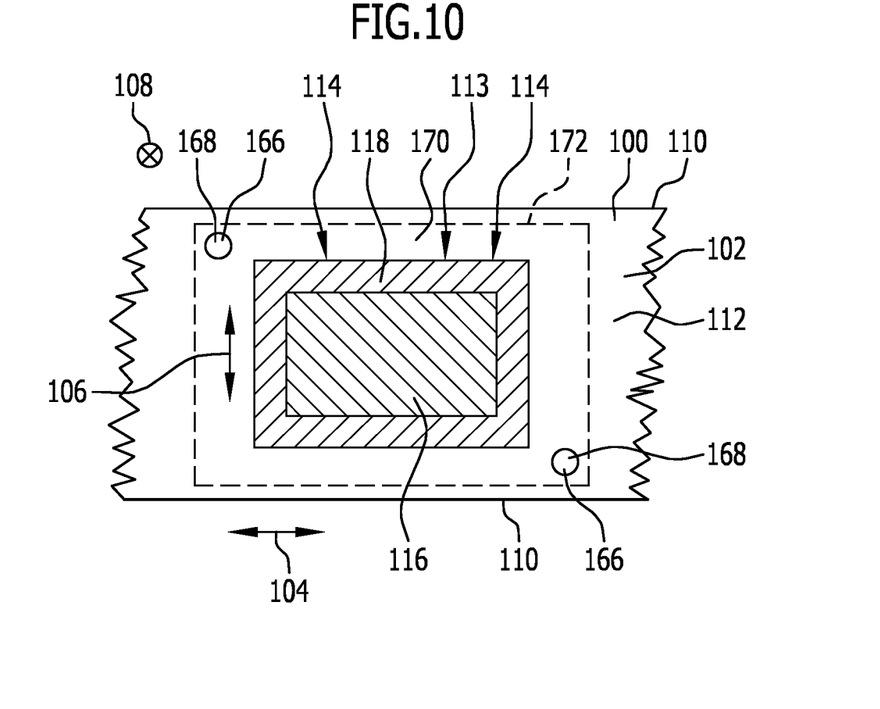
FIG. 10 shows a sectional plan view of a support element on which a gas diffusion layer sealing element unit is arranged, wherein a support element core region is separable out of the support element along a separating line and at least one positioning element is arranged on the support element core region for use in a process step taking place before or after the separating out of the support element core region.

As is depicted in FIG. 10, provision may be made for a support element core region 170, at which a gas diffusion layer sealing element unit 114 is arranged, to be separated out of the support element 100 along a separating line 172.

The support element core region 170 may have one or more positioning elements 166.

The separation of the support element core region 170 out of the support element 100 may place take by means of a multitude of suitable separation methods, for example by means of punching, cutting, roll-cutting, laser cutting, or water jet cutting.

The gas diffusion layer sealing element unit 114 with the support element core region 170 arranged thereon may be reused in a subsequent process, for example in the assembling of an electrochemically active unit 142 or in the mounting of an electrochemical device from the electrochemically active units 142, after being removed from the support element 100.

An exact positioning of the gas diffusion layer sealing element unit 114 can thereby be effected by means of the positioning elements 166 provided on the support element core region 170.

After processing in a subsequent processing step, for example upon the assembling of an electrochemically active unit 142 or of the electrochemical device, the support element core region 170 initially remaining on the gas diffusion layer sealing element unit 114 can be removed entirely or partially from the gas diffusion layer sealing element unit 114. This, in turn, may take place by means of a multitude of suitable separation methods, for example by means of punching, cutting, roll-cutting, laser cutting, or water jet cutting.

Alternatively or in addition hereto, provision may also be made for the support element core region 170 to be released from the gas diffusion layer sealing element unit 114 by pulling the support element core region 170 off of the gas diffusion layer sealing element unit 114 and/or by detaching a folded edge of the support element core region 170 from the gas diffusion layer sealing element unit 114, in particular from the sealing element 118 thereof.

Figure 11:
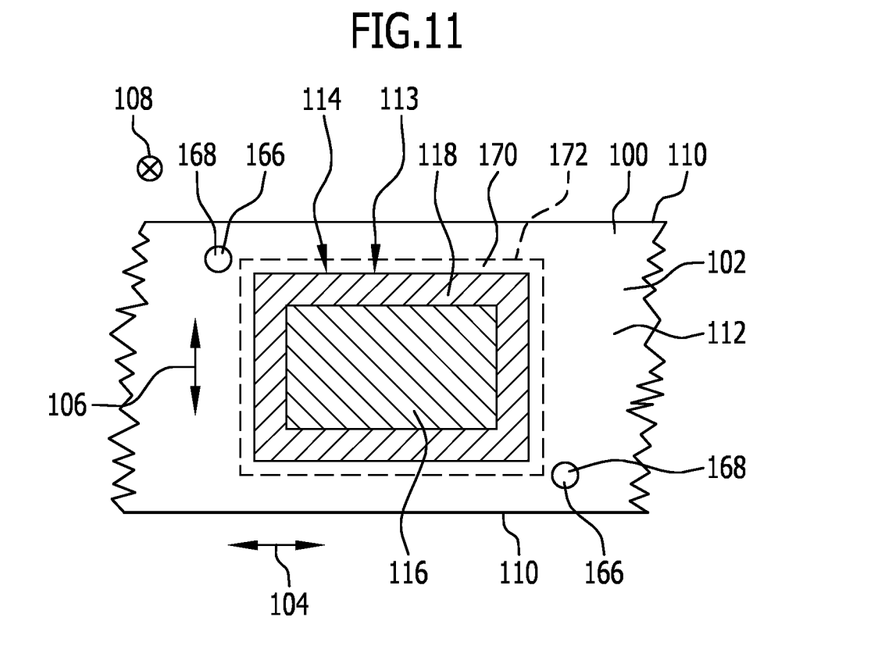
FIG. 11 shows a sectional plan view of a support element with a gas diffusion layer sealing element unit arranged thereon, wherein a support element core region is separable out of the support element along a separating line and at least one positioning element is arranged on the support element outside of the separable support element core region in order to serve for positioning the support element, the gas diffusion layer sealing element unit and/or the gas diffusion layer in a process step taking place before the separating out of the support element core region.

As is depicted in FIG. 11, the support element core region 170 on which the gas diffusion layer sealing element unit 114 is arranged may also be separated out of the support element 100 such that positioning elements 166 provided on the support element 100 are located outside of the support element core region 170.

In this case, too, the support element core region 170 may be separated or detached completely or partially from the gas diffusion layer sealing element unit 114 after a subsequent process step.

Figure 20:
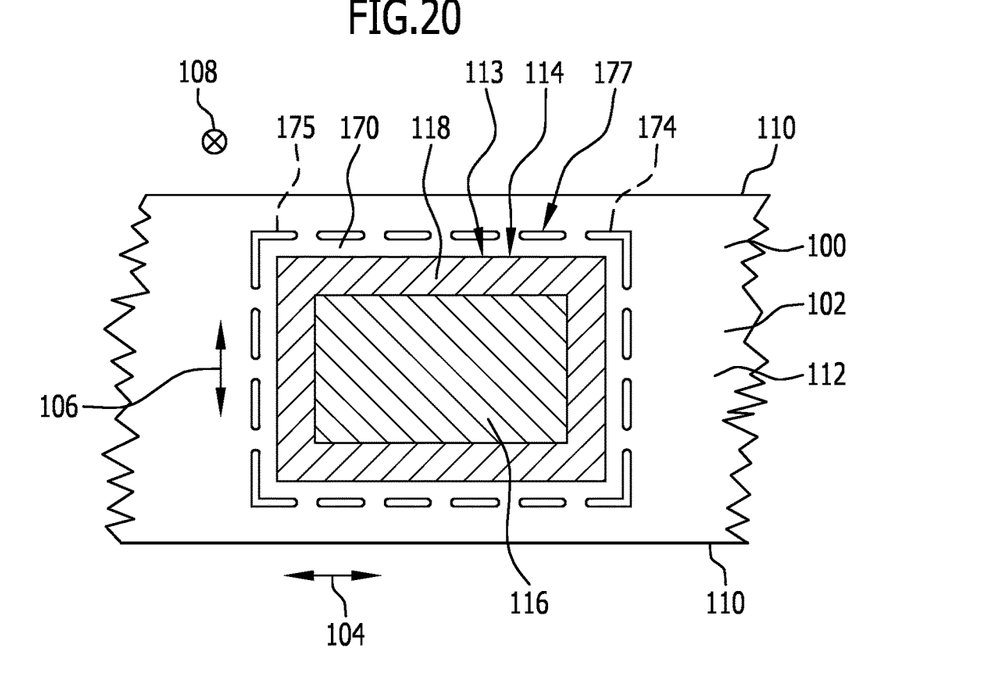
FIG. 20 shows a sectional plan view of a support element on which a gas diffusion layer sealing element unit is arranged, wherein the support element has a perforation, along which a support element core region, at which the gas diffusion layer sealing element unit is arranged, is detachable out of the support element.

In an alternative embodiment, depicted in FIG. 20, of a support element 100 on which at least one gas diffusion layer sealing element unit 114 is arranged, a perforation 177 extending along a perforation line 175 is provided, along which perforation 177 a support element core region 170 can be separated out of the support element 100.

The connection between the support element 100 and the sealing element 118 and/or the gas diffusion layer 116 may be designed in all embodiments of the support element 100 such that a separation of the support element 100 from the gas diffusion layer sealing element unit 114 is possible with little force.

The connection between the support element 100 and the gas diffusion layer sealing element unit 114 may in particular be designed such that the support element can be completely released or removed from the sealing element 118 and/or from the gas diffusion layer 116 with little effort.

Figure 13:
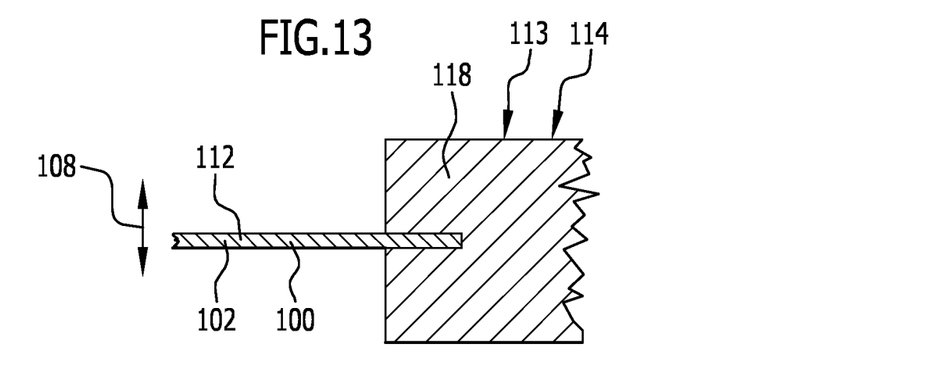
FIG. 13 shows a sectional cut through a sealing element that is connected to a support element.

As is depicted in FIG. 13, the support element 100 may be connected to the sealing element 118 of the gas diffusion layer sealing element unit 114 only by means of adhesion, without positive engagement.

Figure 14:
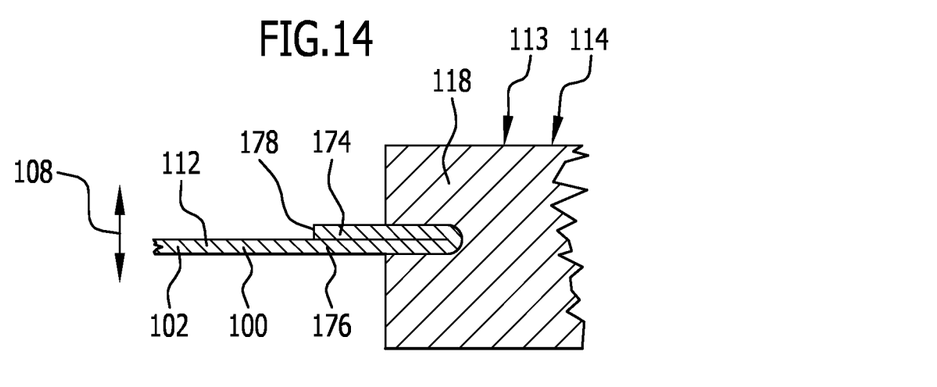
FIG. 14 shows a sectional cut through a sealing element that is connected to a support element, wherein the support element has a folded edge portion bent back to the support element.
Figure 15:
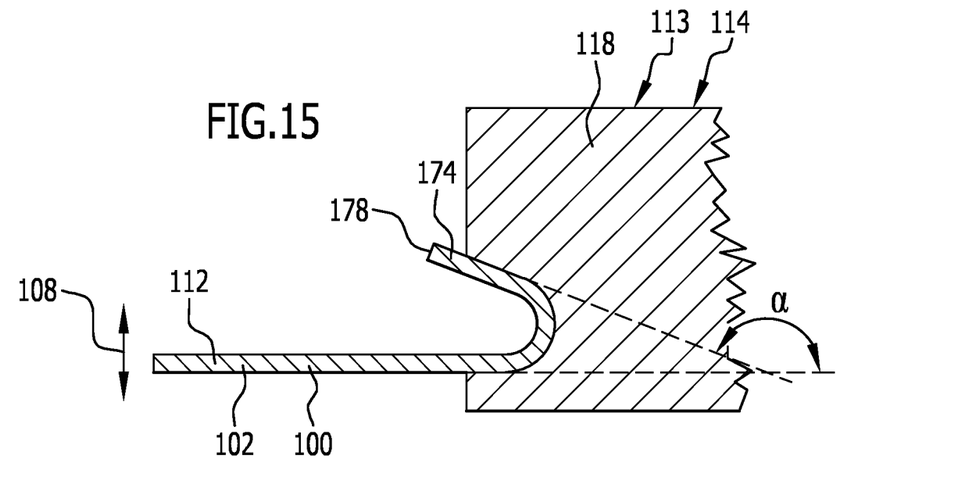
FIG. 15 shows a sectional cut through a sealing element that is connected to a support element, wherein the support element has a curved folded edge portion.
Figure 16:
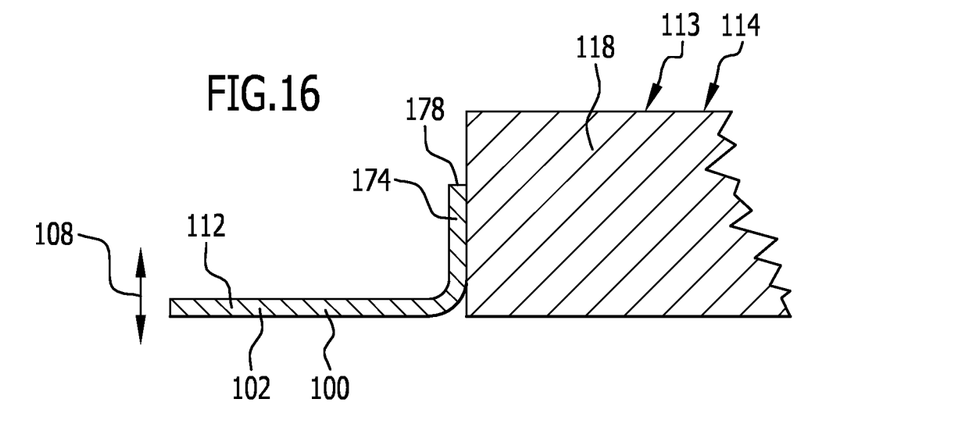
FIG. 16 shows a sectional cut through a sealing element that is connected to a support element, wherein the support element has an angled folded edge portion.

As is depicted in FIGS. 14 to 16, the support element 100 may comprise a folded edge portion 174 at which the sealing element 118 is connected to the support element 100.

As is depicted in FIG. 14, the folded edge portion 174 may be bent back to the support element 100, such that the folded edge portion 174 abuts substantially in surface-to-surface contact against an abutment portion 176 of the support element 100.

As is depicted in FIG. 15, the folded edge portion 174 of the support element 100 may be bent by an acute angle α of more than 90°, preferably more than 120°, and/or preferably less than 160°, such that a rim 178 of the folded edge portion 174 of the support element 100 faces away from the sealing element 118.

As is depicted in FIG. 16, the folded edge portion 174 of the support element 100 may be angled at an angle of substantially 90° and abut substantially in surface-to-surface contact against the sealing element 118 of the gas diffusion layer sealing element unit 114.

Figure 17:
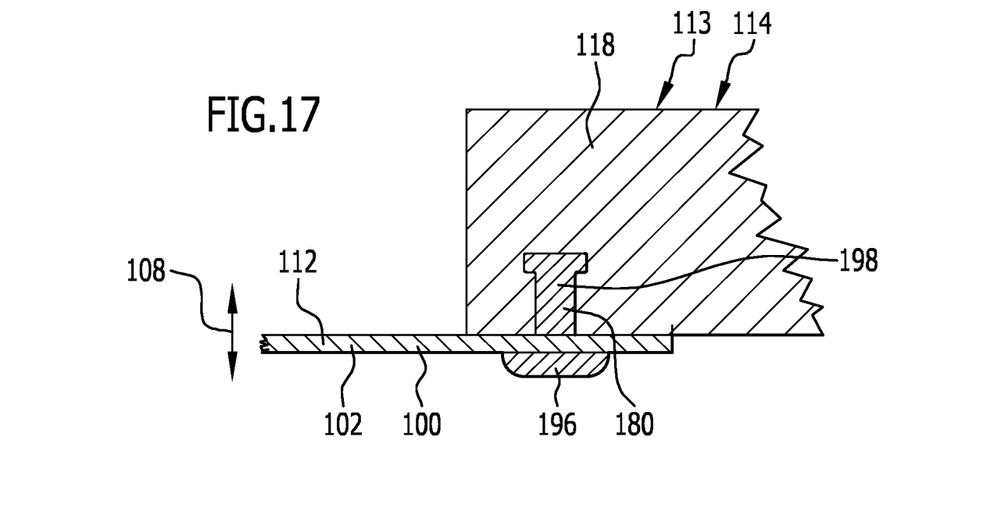
FIG. 17 shows a sectional cut through a sealing element that is connected to a support element, wherein the support element is provided with a holding element for facilitating the connection of the sealing element to the support element.

In an embodiment, depicted in FIG. 17, of a support element 100 on which a gas diffusion layer sealing element unit 114 is arranged, the support element 100 is provided with one or more holding elements 180, which serve to connect the support element 100 to the sealing element 118.

The at least one holding element 180 may be arranged on the support element 100 before or after the production of the sealing element 118 on the gas diffusion layer 116 of the gas diffusion layer sealing element unit 114.

The at least one holding element 180 may be removed from the support element 100 and/or from the gas diffusion layer sealing element unit 114 before the assembling process of the electrochemically active unit 142. Alternatively thereto, the at least one holding element 180 may also remain on the gas diffusion layer sealing element unit 114 in the completely mounted state of the electrochemically active unit 142.

The at least one holding element 180 may simultaneously serve as a positioning element for positioning the support element 100 and/or the gas diffusion layer sealing element unit 114 in different process steps, for example in the production of the sealing element 118 on the gas diffusion layer 116, in the assembling of the electrochemically active unit 142, in the measurement of the gas diffusion layer sealing element unit 114, in the measurement of the electrochemically active unit 142 or in other process steps.

For a particularly exact positioning by means of the at least one holding element 180, provision may be made for at least one positioning feature to be provided on the respective holding element 180, for example in the form of a bore or a marking.

The at least one holding element 180 and/or the at least one positioning element 166 may be used, in particular, to position the gas diffusion layer sealing element unit 114 in a positioning unit, before or after the gas diffusion layer sealing element unit 114 has been released from the support element 100.

The gas diffusion layer sealing element unit 114 released from the support element 100 can then be received from such a positioning unit by means of a handling apparatus and be processed in a subsequent process step, for example in the assembling of the electrochemically active unit 142.

The at least one holding element 180 may comprise e.g., a head 196, which may abut against the support element 100, and/or a shank 198, which may extend through a through-opening in the support element 100 and in particular extend into the sealing element 118.

Figure 18:
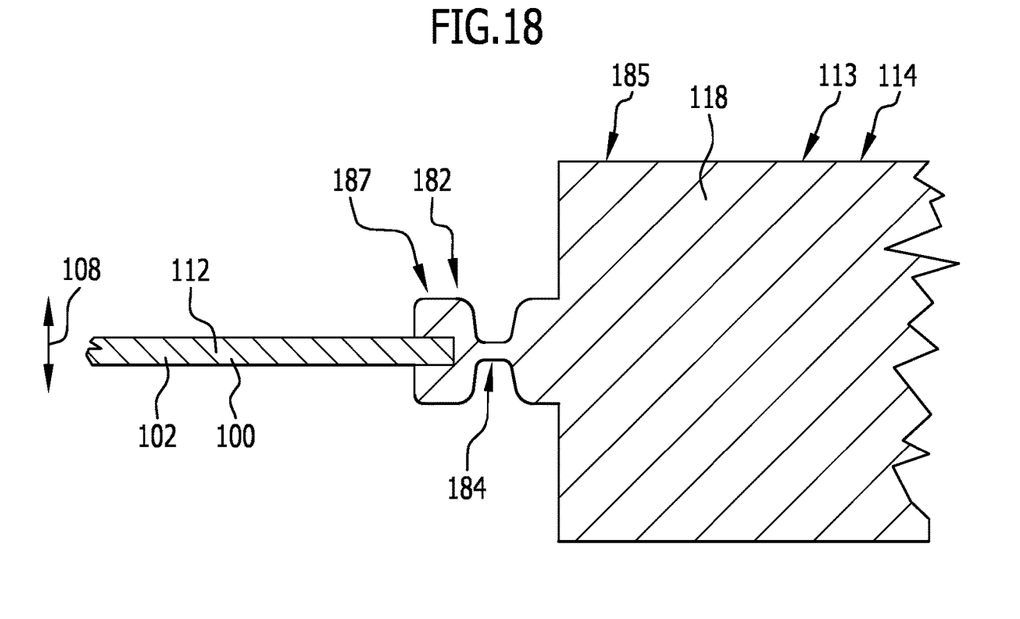
FIG. 18 shows a sectional cut through a sealing element that is connected to a support element, wherein the support element is provided with a predetermined breaking point in a rim region of the support element that faces toward the same.

In one embodiment, depicted in FIG. 18, of a support element 100 on which a gas diffusion layer sealing element unit 114 is arranged, the sealing element 118 of the gas diffusion layer sealing element unit 114 is provided with a predetermined breaking point 184 in a rim region 182 facing toward the support element 100, such that the gas diffusion layer sealing element unit 114 can be easily released from the support element 100 without a portion of the support element 100 remaining on the removed gas diffusion layer sealing element unit 114.

A sealing element outside region 187 may hereby remain on the support element 100, while a sealing element core region 185 separated from the sealing element outside region 187 along the predetermined breaking point 184 remains on the gas diffusion layer 116.

Figure 19:
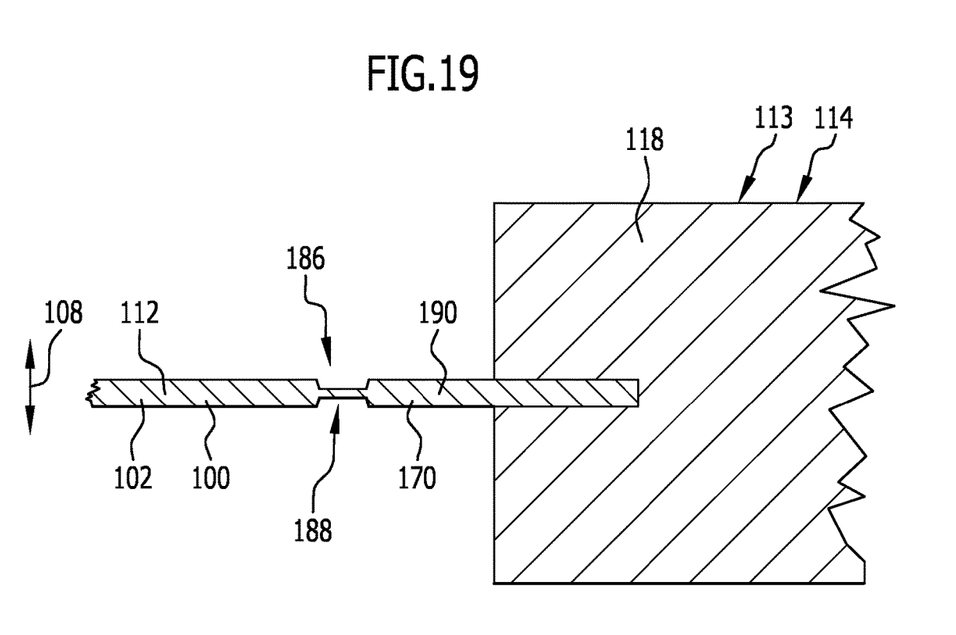
FIG. 19 shows a sectional cut through a sealing element that is connected to a support element, wherein the support element is provided with a predetermined breaking point in a rim region of the sealing element that faces toward the same.

In the embodiment, depicted in FIG. 19, of a support element 100 on which a gas diffusion layer sealing element unit 114 is arranged, the support element 100 is provided with a predetermined breaking point 188 in a rim region 186 facing toward the sealing element 118 of the gas diffusion layer sealing element unit 114, wherein the gas diffusion layer sealing element unit 114 is separable out of the support element 100 in a simple manner in such a way that a residual region 190 of the support element 100 arranged on the side of the predetermined breaking point 188 facing toward the sealing element 118 remains on the sealing element 118 after the separation of the gas diffusion layer sealing element unit 114 and thus forms a support element core region 170 arranged on the gas diffusion layer sealing element unit 114.

Figure 21:
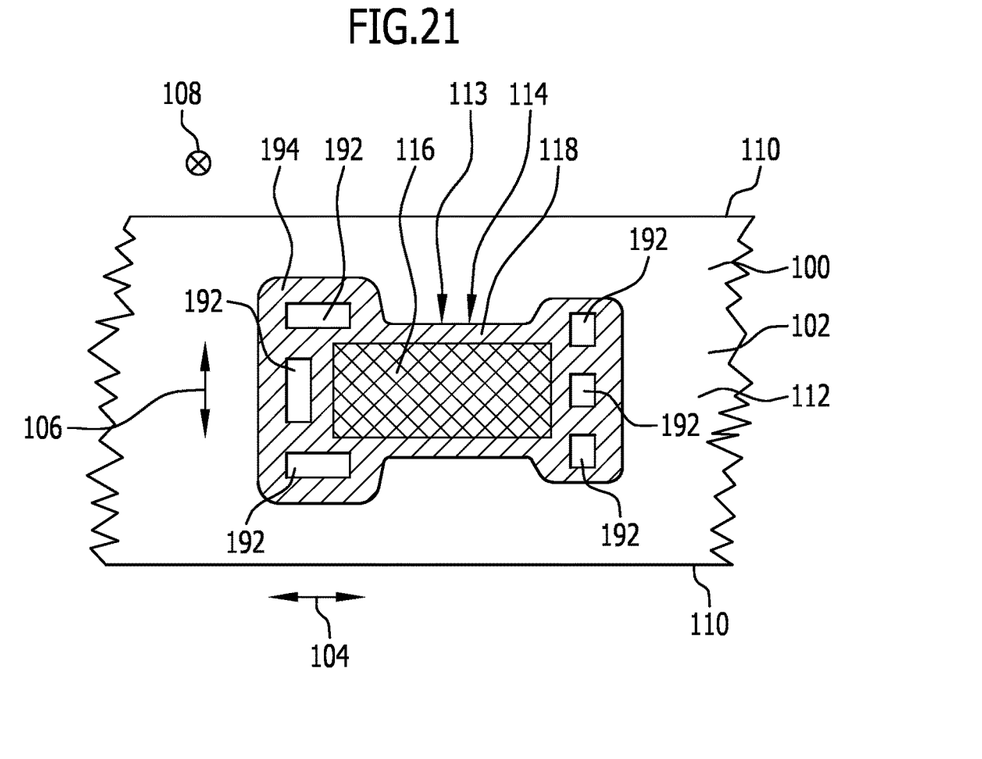
FIG. 21 shows a sectional plan view of a support element on which a gas diffusion layer sealing element unit is arranged, wherein the sealing element of the gas diffusion layer sealing element unit is connected to the support element only in an outside region of the sealing element and wherein the sealing element has medium through-openings and the support element does not overlap the medium through-openings.

In the embodiment, depicted in FIG. 21, of a support element 100 on which at least one gas diffusion layer sealing element unit 114 is arranged, the sealing element 118 of the gas diffusion layer sealing element unit 114 has medium through-openings 192 which, in the mounted state of the electrochemical device, form constituent parts of at least one respective medium channel, by means of which a fluid medium (for example a fuel gas, an oxidizing agent, or a cooling agent) is suppliable to the electrochemically active units 142 of the electrochemical device or is dischargeable from the electrochemically active units 142 of the electrochemical device.

The sealing element 118 is connected to the support element 100 only in an outside region 194, and the support element 100 does not overlap the medium through-openings 192 in the sealing element 118. Thus, in particular, the outside region 194 of the sealing element 118, which can be very instable and difficult to position, is stabilized by the support element 100.

In this embodiment, the gas diffusion layer 116 is preferably not connected to the support element 100.

The invention claimed is:

1. A method for producing an electrochemically active unit that comprises a membrane and at least one assembly, which comprises a gas diffusion layer and a sealing element produced on the gas diffusion layer, wherein the method comprises the following:
    producing the sealing element on the gas diffusion layer;
    connecting the sealing element and/or the gas diffusion layer to a support element;
    assembling the membrane and the at least one assembly, which comprises the gas diffusion layer and the sealing element, to form the electrochemically active unit;
    wherein a support element core region connected to the sealing element and/or to the gas diffusion layer is separated out of the support element.

2. The method in accordance with claim 1, wherein the gas diffusion layer is connected to the support element before the production of the sealing element.

3. The method in accordance with claim 1, wherein the sealing element, in the production thereof, is connected to the support element.

4. The method in accordance with claim 1, wherein the sealing element is produced by means of an injection molding operation, by means of a screen printing operation, or by means of a dispenser application operation.

5. The method in accordance with claim 1, wherein the sealing element is in contact with the support element along the entire periphery of said sealing element.

6. The method in accordance with claim 1, wherein the sealing element is in contact with the support element at a plurality of contact regions spaced at a distance from each other along a peripheral direction of the sealing element.

7. The method in accordance with claim 1, wherein the support element comprises a foil and/or a band.

8. The method in accordance with claim 1, wherein only one sealing element is connected to the support element.

9. The method in accordance with claim 1, wherein a plurality of sealing elements and/or a plurality of gas diffusion layers are connected to the same support element.

10. The method in accordance with claim 1, wherein the support element is wound up with the at least one sealing element arranged thereon and/or the at least one gas diffusion layer arranged thereon.

11. The method in accordance with claim 10, wherein at least one intermediate element is introduced between successive wound layers of the support element.

12. The method in accordance with claim 1, wherein at least one sealing element arranged on the support element and/or at least one gas diffusion layer arranged on the support element is coated with a coating material.

13. The method in accordance with claim 1, wherein the assembling of the membrane and the at least one assembly, which comprises the gas diffusion layer and the sealing element, takes place in a rolling process in which the at least one assembly arranged on the support element and the membrane arranged on a membrane support element are joined.

14. The method in accordance with claim 1, wherein the support element is provided with at least one positioning element and/or with at least one holding element.

15. The method in accordance with claim 1, wherein the sealing element has a predetermined breaking point, along which a sealing element core region is separated from a sealing element outside region.

16. The method in accordance with claim 1, wherein the support element remains on the assembly after the assembling of the electrochemically active unit.

17. A support element for an assembly, which comprises a gas diffusion layer and a sealing element produced on the gas diffusion layer, wherein the sealing element and/or the gas diffusion layer is connected to the support element,
wherein the support element comprises a separating line along which a support element core region connected to the sealing element and/or to the gas diffusion layer is separatable out of the support element.

18. An electrochemically active unit, comprising a membrane,
at least one assembly, which comprises a gas diffusion layer and a sealing element produced on the gas diffusion layer, and
at least one support element core region which is separated out of a support element,
wherein the sealing element and/or the gas diffusion layer is connected to the support element core region.

19. The electrochemically active unit in accordance with claim 18, wherein the assembly is connected at its outer periphery, at least in regions, to the support element core region.

20. The electrochemically active unit in accordance with claim 18, wherein the support element core region is in contact only with the sealing element of the assembly.

21. The electrochemically active unit in accordance with claim 18, wherein an outside region of the sealing element is stabilized by the support element core region.

* * * * *